United States Patent
Mizotani et al.

(10) Patent No.: US 10,787,041 B2
(45) Date of Patent: Sep. 29, 2020

(54) PNEUMATIC TIRE WITH LAYERED DECORATIVE PORTION ON SIDEWALL OUTER SURFACE

(71) Applicant: BRIDGESTONE CORPORATION, Chuo-ku, Tokyo (JP)

(72) Inventors: Kentaro Mizotani, Kodaira (JP); Nobuyuki Hirai, Kodaira (JP); Takashi Kuwahara, Higashiyamato (JP); Yuki Nakamura, Hikone (JP); Keita Oshikane, Tachikawa (JP); Toshio Furutaka, Yokohama (JP); Yasuma Saito, Yokohama (JP); Yukio Sugita, Yokohama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 653 days.

(21) Appl. No.: 15/502,269

(22) PCT Filed: Jul. 24, 2015

(86) PCT No.: PCT/JP2015/003727
§ 371 (c)(1),
(2) Date: Feb. 7, 2017

(87) PCT Pub. No.: WO2016/021138
PCT Pub. Date: Feb. 11, 2016

(65) Prior Publication Data
US 2017/0240002 A1  Aug. 24, 2017

(30) Foreign Application Priority Data
Aug. 8, 2014 (JP) ................. 2014-163064

(51) Int. Cl.
*B60C 13/04* (2006.01)
*B60C 13/00* (2006.01)
*B29D 30/72* (2006.01)

(52) U.S. Cl.
CPC ............ *B60C 13/001* (2013.01); *B60C 13/00* (2013.01); *B60C 13/002* (2013.01); *B60C 13/04* (2013.01);
(Continued)

(58) Field of Classification Search
CPC ..... B60C 13/00; B60C 13/001; B60C 13/002; B60C 13/04; B60C 2013/045;
(Continued)

(56) References Cited

U.S. PATENT DOCUMENTS 3,607,498 A  9/1971 Kubota
2015/0010737 A1  1/2015 Saito et al.

FOREIGN PATENT DOCUMENTS

EP  2612762 A1  7/2013
JP  H04121205 A  4/1992
(Continued)

OTHER PUBLICATIONS

English machine translation of WO 2016/031141 A1, Mar. 3, 2016.*
(Continued)

*Primary Examiner* — Adrienne C. Johnstone
(74) *Attorney, Agent, or Firm* — Kenja IP Law PC

(57) ABSTRACT

Provided is a pneumatic tire including, on an outer surface of its sidewall portion, a decorative portion including a print layer and a protective layer located on a tire outer side of the print layer. The decorative portion further includes an intermediate layer located between the print layer and the protective layer. When a storage modulus of the print layer, a storage modulus of the protective layer, and a storage modulus of the intermediate layer are respectively defined as $E1'$, $E2'$, and $E3'$, the following relational expression is satisfied: $E2'>E3'>E1'$.

7 Claims, 2 Drawing Sheets

(52) U.S. Cl.
CPC ........ *B29D 30/72* (2013.01); *B60C 2013/006* (2013.01); *B60C 2013/045* (2013.01)

(58) Field of Classification Search
CPC ........ B60C 2013/006; B60C 2013/005; B60C 2013/007; B29D 30/72; B29D 2030/726; B29D 2030/728
USPC ................................. 152/524, 525; 156/116
See application file for complete search history.

(56) References Cited

FOREIGN PATENT DOCUMENTS

| | | | |
|---|---|---|---|
| JP | 2000185528 | A | 7/2000 |
| JP | 2007210378 | A | 8/2007 |
| JP | 2009280070 | A | 12/2009 |
| JP | 2013237292 | A | 11/2013 |
| WO | 2007121473 | A1 | 10/2007 |
| WO | 2012029590 | A1 | 3/2012 |
| WO | 2013105662 | A1 | 7/2013 |
| WO | WO-2016/031141 | A1 * | 3/2016 |

OTHER PUBLICATIONS

Nov. 1, 2017, Search Result of Office Action issued by the State Intellectual Property Office in the corresponding Chinese Patent Application No. 201580042399.2.

* cited by examiner

PNEUMATIC TIRE WITH LAYERED DECORATIVE PORTION ON SIDEWALL OUTER SURFACE

TECHNICAL FIELD

The present disclosure relates to a pneumatic tire.

BACKGROUND

There have been proposed a variety of pneumatic tires (hereinafter, may be simply called tires) provided, on an outer surface of a sidewall portion thereof, with a decorative portion formed by an annular or other shaped print layer (refer to, for example, Patent Literature 1).

CITATION LIST

Patent Literature

PL1: JP2013237292A

SUMMARY

Technical Problems

In the above regard, when the decorative portion formed by the print layer as described above is provided in a tire, cracks may occur in the decorative portion due to strain caused by deformation of the tire during running. Accordingly, there is a need for improving durability of the decorative portion. Furthermore, the print layer may peel off when the tire contacts a curbstone or the like. Accordingly, there is also a need for improving resistance to external damage of the decorative portion including the print layer.

The present disclosure has been conceived in light of the above problems, and the present disclosure is to provide a pneumatic tire in which durability and resistance to external damage of the decorative portion in the sidewall portion are improved.

Solution to Problems

A summary of the present disclosure is as follows.

A pneumatic tire including, on an outer surface of a sidewall portion thereof, a decorative portion including a print layer and a protective layer located on a tire outer side of the print layer, wherein the decorative portion further includes an intermediate layer located between the print layer and the protective layer, and when a storage modulus of the print layer, a storage modulus of the protective layer, and a storage modulus of the intermediate layer are respectively defined as $E1'$, $E2'$, and $E3'$, the following relational expression is satisfied:

$$E2'>E3'>E1'.$$

Herein, a "storage modulus" refers to a storage modulus that is measured at 25° C. according to JIS K7244.

A "thickness of layer" herein refers to a thickness that is measured at a maximum width position of the layer and measured when the tire is mounted to an applicable rim, filled with a predetermined internal pressure, and placed under no load. Herein, an "applicable rim" refers to any of rims specified in industrial standards valid in respective regions where tires are manufactured and used. Examples of such industrial standards include Japan Automobile Tire Manufacturers Association (JATMA) YEAR BOOK in Japan, European Tire and Rim Technical Organization (ETRTO) STANDARDS MANUAL in Europe, and the TIRE and RIM ASSOCIATION INC. (TRA) YEAR BOOK in the United States. A "prescribed internal pressure" refers to an air pressure (maximum air pressure corresponding to a tire maximum load capacity for a tire of applicable size as specified in JATMA or other standards.

Herein, a "contrast ratio" described below refers to a paint area per unit area on a tire surface and may be obtained, for example, by measuring an area over which paint is applied through image processing with a microscope.

Advantageous Effects

The present disclosure provides a pneumatic tire in which durability and resistance to external damage of the decorative portion in the sidewall portion are improved.

DETAILED DESCRIPTION

Hereinafter, embodiments of the present disclosure will be described in detail for illustration with reference to the drawings.

Figure 1:
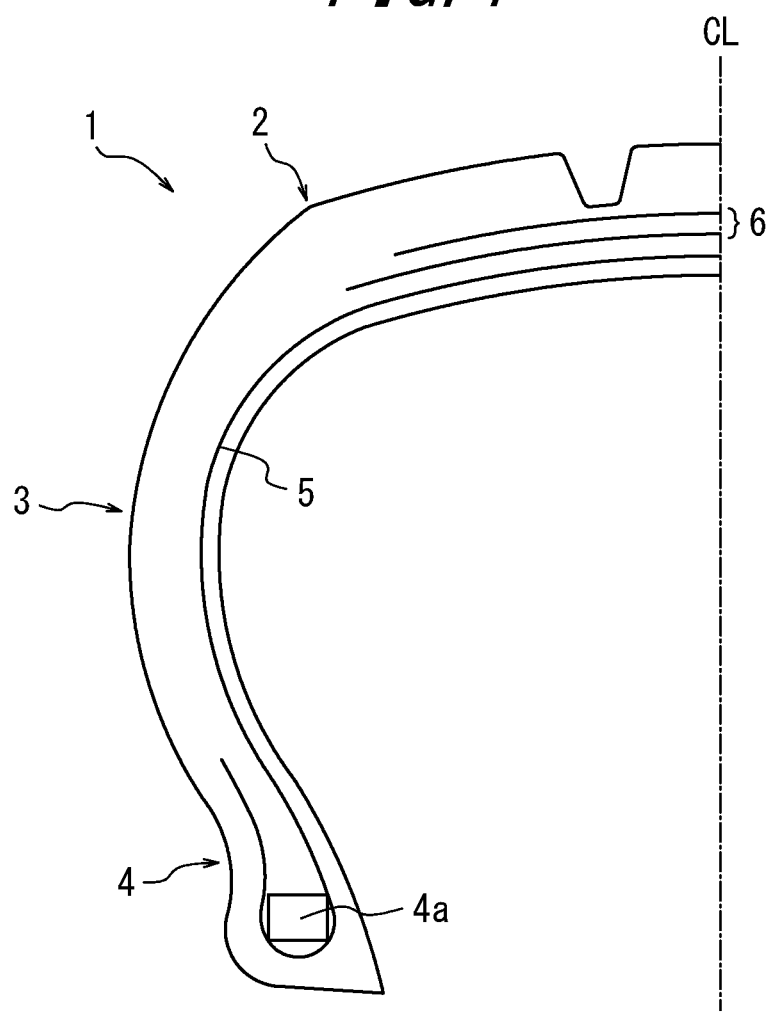
FIG. 1 is a sectional view in a tire width direction of a pneumatic tire according to one of embodiments of the present disclosure.

FIG. 1 is a sectional view in a tire width direction of a pneumatic tire according to one of embodiments of the present disclosure. Although FIG. 1 illustrates only a half portion in the tire width direction that is demarcated by a tire equatorial plane CL as a boundary, the other half portion in the tire width direction, which is not illustrated, has the same structure. As illustrated in FIG. 1, the pneumatic tire 1 includes an annular tread portion 2, which extends continuously in a tire circumferential direction, a pair of sidewall portions 3 (with only one of the sidewall portions 3 illustrated in FIG. 1), which extends contiguously with sides of the tread portion 2 toward an inner side in a tire radial direction, and a pair of bead portions 4 (with only one of the bead portions 4 illustrated in FIG. 1), which is contiguous with inner sides in the tire radial direction of the side wall portions 3. Herein, although an internal structure of the tire is not particularly limited, the tire 1 in an example of FIG. 1 includes a carcass 5, which extends toroidally between a pair of bead cores 4a (with only one of the bead cores 4a illustrated in FIG. 1) embedded in the bead portions 4, and a belt 6, which is disposed on the outer side in the tire radial direction of the carcass 5 and which includes two belt layers in this example.

Figure 2:
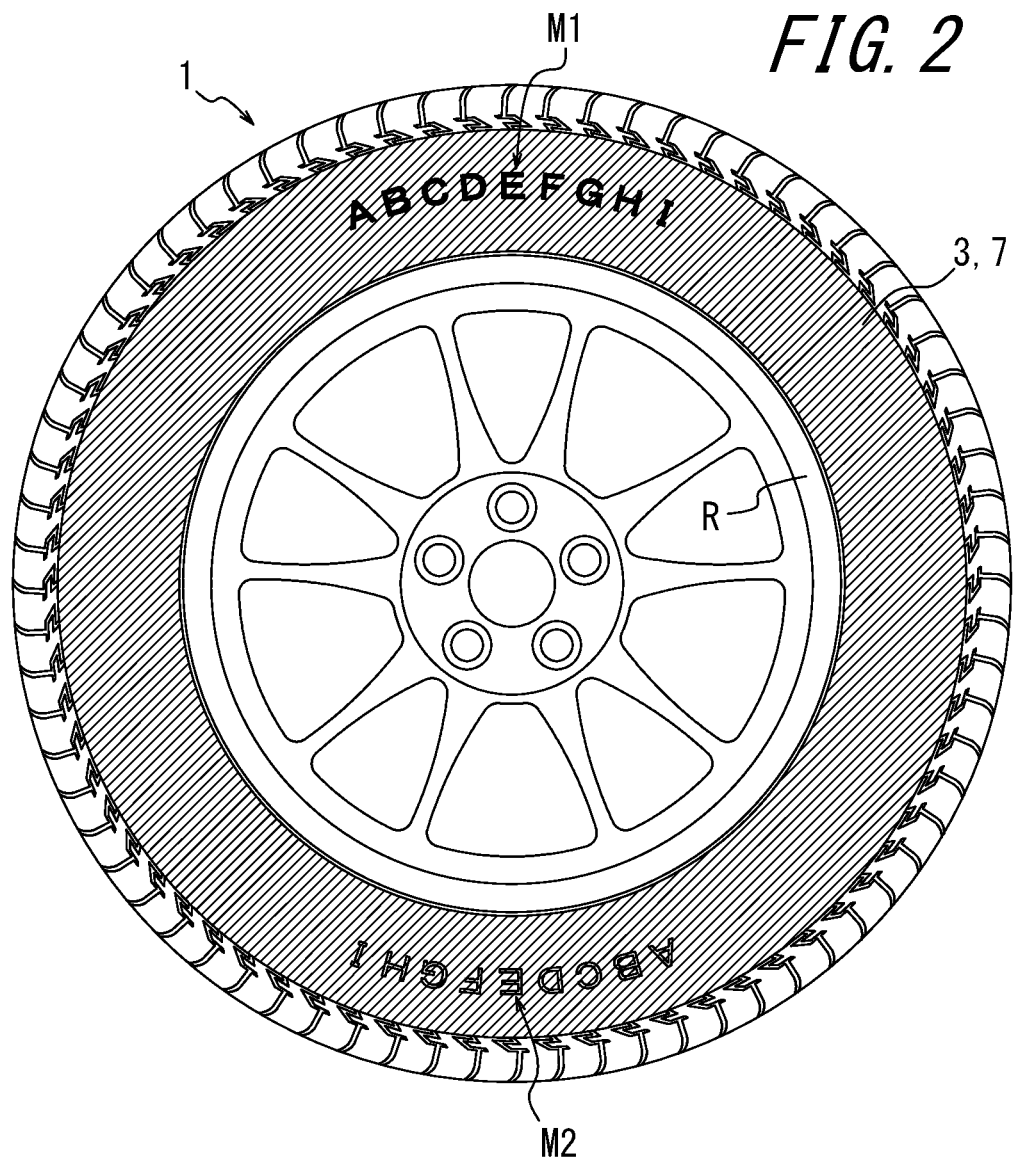
FIG. 2 is a side view of a tire-rim assembly in which a pneumatic tire is mounted to a rim according to one of embodiments of the present disclosure.

FIG. 2 is a side view of a tire-rim assembly in which a pneumatic tire is mounted to an applicable rim according to one of embodiments of the present disclosure. As illustrated in FIG. 2, the tire 1 is mounted to an applicable rim R, and the tire 1 includes, on an outer surface 3a of the sidewall portion 3, an annular decorative portion 7 in the illustrated example. In the illustrated example, markings M1 and M2, which include alphabets, are applied to two positions on a circumference of the decorative portion 7. Additionally, the decorative portion 7 may also be provided partially on the circumference of sidewall portion 3. For example, the decorative portion 7 may be provided in the two positions to which the markings M1 and M2 are applied.

Figure 3:
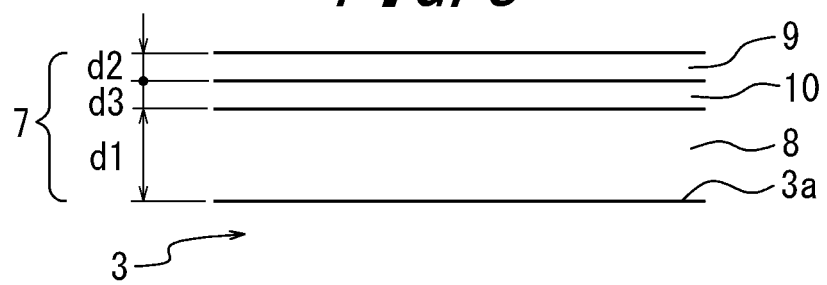
FIG. 3 is a partial sectional view schematically illustrating a decorative portion and a sidewall portion.

Reference is next made to FIG. 3, which is a partial sectional view schematically illustrating the decorative portion 7 and the sidewall portion 3. As illustrated in FIG. 3, the decorative portion 7 includes a print layer 8 and a protective layer 9, which is located on the tire outer side of the print layer 8 to protect the print layer 8 against external damage. The decorative portion 7 further includes an intermediate layer 10, which is located between the print layer 8 and the protective layer 9.

In the present embodiment herein, the print layer 8 may be formed by applying paint, such as ink, to the outer surface 3a of the sidewall portion 3 by screen printing, ink jet printing, relief printing, or another printing process.

The print layer 8 may have a laminated structure of a white-paint layer and a color-paint layer (in any color other than white) disposed on the tire outer side of the white-paint layer. To produce the decorative portion 7 with excellent color density, it is preferable to make the white-paint layer thicker than the color-paint layer. The above laminated structure may be applied to an entirety or part of the circumference of the print layer 8. The color-paint layer may be laminated directly on a surface of the white-paint layer or may be formed via a primer layer.

Furthermore, the print layer 8 and a rubber layer (side rubber) constituting the sidewall portion 3 may be in direct contact or may be in contact via a primer layer. When the print layer 8 is disposed on the tire outer side of the tire side rubber via the primer layer, the primer layer may be made of the same material as the intermediate layer 10. This omits the need for preparing individual materials (such as inks) and reduces cost.

In the present embodiment, the intermediate layer 10 and the protective layer 9 are formed as transparent layers so that the print layer 8 is visible.

Meanwhile, when a storage modulus of the print layer 8, a storage modulus of the protective layer 9, and a storage modulus of the intermediate layer 10 are respectively defined as $E1'$, $E2'$, and $E3'$, the pneumatic tire of the present embodiment satisfies the following relational expression:

$$E2' > E3' > E1'.$$

The following describes effects of the pneumatic tire of the present embodiment.

First of all, one possible way to increase resistance to external damage of the decorative portion 7 is to use the protective layer 9 having a high storage modulus. However, a great difference in rigidity between the protective layer 9 and the print layer 8 might lead to occurrence of cracks at an interface therebetween due to strain of the tire, a rubber article. In the present embodiment, since the intermediate layer 10, which has a storage modulus satisfying the above relational expression, is disposed between the print layer 8 and the protective layer 9, the difference in rigidity from the print layer 8 to the protective layer 9 is mitigated. Accordingly, the present embodiment improves durability of the decorative portion 7, while disposing the protective layer 9, which has a storage modulus sufficient for resistance to external damage to be demonstrated. Thus, according to the tire of the present disclosure, durability and resistance to external damage of the decorative portion in the sidewall portion are improved.

In the above regard, in the pneumatic tire according to the present disclosure, the ratio $E2'/E3'$ and the ratio $E3'/E1'$ preferably satisfy the following relational expression:

$$E2'/E3' < E3'/E1'.$$

The aforementioned difference in rigidity tends to be relatively mitigated in the presence of a soft layer like the print layer 8. Accordingly, the ratio $E3'/E1'$ of the storage modulus of the intermediate layer 10 to the storage modulus of the print layer 8, on the side in which the storage moduli are high, is set to be greater than the ratio $E2'/E3'$ of the storage modulus of the protective layer 9 to the storage modulus of the intermediate layer 10, on the side in which the storage moduli are low. Consequently, durability and resistance to external damage of the decorative portion 7 as a whole is further improved.

Furthermore, in the pneumatic tire according to the present disclosure, the ratio $E2'/E1'$ preferably satisfies the following relational expression:

$$E2'/E1' \geq 5.$$

Setting the ratio $E2'/E1'$ to be 5 or more allows function dissociation in which resistance to external damage is improved in the protective layer 9, which has a high storage modulus, and durability is maintained in the print layer 8, which has a low storage modulus. Accordingly, durability and resistance to external damage of the decorative portion 7 are even further improved.

Additionally, from the perspective of maintaining durability of the decorative portion 7 by preventing an excessive difference in rigidity from the protective layer 9 to the print layer 8, the above ratio $E2'/E1'$ preferably satisfies the following relational expression:

$$E2'/E1' \leq 100.$$

Moreover, in the pneumatic tire according to the present disclosure, when a storage modulus of side rubber (rubber constituting the sidewall portion 3) that is adjacent to the tire inner side of the decorative portion 7 is defined as $E4'$, the following relational expressions are preferably satisfied:

$$E1' < E4'; \text{ and } E3' < E4'.$$

When the above relational expressions are satisfied, the print layer 8 and the intermediate layer 10 are even better adaptive to strain of side rubber caused especially by deformation of the sidewall portion 3 of the tire, and durability of the decorative portion 7 is even further improved.

In more detail, from the perspective of improving resistance to external damage in the protective layer 9, which has a high storage modulus, and maintaining durability in the print layer 8, which has a low storage modulus, the storage modulus $E1'$ of the print layer 8 is preferably $1.0 \times 10^8$ (Pa) or less, and the storage modulus $E2'$ of the protective layer 9 is preferably $1.0 \times 10^7$ (Pa) or more.

On the other hand, from the perspective of maintaining durability of the decorative portion 7 by preventing an excessive difference in rigidity from the protective layer 9 to the print layer 8, the storage modulus $E1'$ of the print layer 8 is preferably $1.0 \times 10^6$ (Pa) or more, and the storage modulus $E2'$ of the protective layer 9 is preferably $5.0 \times 10^8$ (Pa) or less.

In the present disclosure herein, examples of materials of the print layer 8 may include, but not particularly limited to, active energy ray curing ink that is composed mainly of oligomer, monomer, and a coloring agent and that also contains, as needed, a photopolymerization initiator, an ultraviolet absorbing agent, an antioxidant, a light stabilizer, an adhesion promoter, a rheology control agent, a dispersant, or the like. The storage modulus E1' of the print layer 8 may be regulated to be within a predetermined range by controlling the amounts of the above materials. In more detail, for example, UF-245 ink series manufactured by DNP Fine Chemicals Co., Ltd. may be used as materials of the print layer 8. Examples of materials of the protective layer 9 may include, but not particularly limited to, (meth)acrylic acid-based resin or resin obtained by silicone-modification of (meth)acrylic acid-based resin. In addition to such resin, urethane-based resin or any resin containing resin obtained by carbonate-modification of urethane-based resin may also be used. In more detail, as materials of the protective layer 9, for example, "OP-SA13", "OP-SA79", "OP-SA355", and "OP-SA356" manufactured by DNP Fine Chemicals Co., Ltd. may be considered as (meth)acrylic acid-based resin or resin obtained by silicone-modification of (meth)acrylic acid-based resin, and "OP-U354" manufactured by DNP Fine Chemicals Co., Ltd. may be considered as urethane-based resin or resin obtained by carbonate-modification of urethane-based resin. The storage modulus E2' of the protective layer 9 may be regulated to be within a predetermined range by controlling the amounts of the above materials. Examples of materials of the intermediate layer 10 may include, but not particularly limited to, active energy ray curing ink for forming the intermediate layer that is composed mainly of oligomer and monomer and that also contains, as needed, a photopolymerization initiator, an ultraviolet absorbing agent, an antioxidant, a light stabilizer, an adhesion promoter, a rheology control agent, or the like. In more detail, for example, UF-64 ink series manufactured by DNP Fine Chemicals Co., Ltd. may be used as materials of the intermediate layer 10. The storage modulus E3' of the intermediate layer 10 may be regulated to be within a predetermined range by controlling the amounts of the above materials. Additionally, examples of an active energy ray may include an $\alpha$-ray, a $\gamma$-ray, an X-ray, an ultraviolet ray, and an electron beam.

In the pneumatic tire according to the present disclosure, a thickness d1 of the print layer 8 is preferably greater than a thickness d2 of the protective layer 9 and a thickness d3 of the intermediate layer 10.

By making the thickness of the print layer 8, which has the lowest storage modulus and is softest, greatest of all, flexibility of the decorative portion 7 as a whole is improved, and durability of the decorative portion 7 is even further improved.

In the above regard, in the pneumatic tire according to the present disclosure, the ratio d2/d1 and the ratio d3/d1 preferably satisfy the following relational expressions:

$$d2/d1 \leq \tfrac{1}{2}; \text{ and } d3/d1 \leq \tfrac{1}{2}.$$

By increasing the thickness of the print layer 8, which has the smallest storage modulus, so that the above relational expressions are satisfied, strain of the tire is received by the print layer 8. Consequently, durability of the decorative portion 7 is even further improved.

For the same reason, a total sum (d2+d3) of the thickness d2 of the protective layer 9 and the thickness d3 of the intermediate layer 10 is preferably ½ or less the thickness d1 of the print layer 8.

For example, to further ensure both durability and resistance to external damage of the decorative portion 7, the thickness d1 of the print layer 8 is preferably from 30 to 60 μm, the thickness d2 of the protective layer 9 is preferably from 10 to 15 μm, and the thickness d3 of the intermediate layer 10 is preferably from 10 to 20 μm.

Moreover, in the pneumatic tire according to the present disclosure, the contrast ratio of the intermediate layer 10 is preferably less than the contrast ratio of the print layer 8 and the contrast ratio of the protective layer 9.

Reducing the contrast ratio of the intermediate layer 10 creates a catch due to microscopic irregularities and accordingly, further improves adhesiveness between the intermediate layer 10 and the print layer 8. Furthermore, at an interface between the intermediate layer 10 and the print layer 8, a region over which paint is not applied microscopically is created, and strain is released. Accordingly, durability of the decorative portion 7 is further improved.

Examples

To confirm the effects of the present disclosure, tires according to Examples 1 to 5 and a tire according to Comparative Example 1 were experimentally produced and each tested for evaluating durability and resistance to external damage of the decorative portion. The tires each have the common internal structure as illustrated in FIG. 1 and include, on the outer surface of the sidewall portion, the decorative portion including the print layer, the protective layer, and the intermediate layer. The tires have specifications shown in Table 1 below and are common in terms of other specifications not listed in Table 1.

<Durability of Decorative Portion>

Each tire was mounted to an applicable rim, filled with a prescribed internal pressure, and installed on a vehicle. Then, after driven for 20,000 km on the actual vehicle, each tire was tested to measure the length of a crack occurring in the decorative portion for evaluating durability of the decorative portion. The evaluation is expressed as an index value, with the result for the tire according to Comparative Example 1 as 100. A larger value indicates better durability of the decorative portion (i.e., a shorter length of crack).

<Resistance to External Damage of Decorative Portion>

For each of the tires, the decorative portion was subjected to a scratch test with a coin under a load condition of 1200 g, and according to the number of scratches observed when peeling occurred in the decorative portion, resistance to external damage of the decorative portion was evaluated. The evaluation is expressed as an index value, with the result for the tire according to Comparative Example 1 as 100. A larger value indicates better resistance to external damage of the decorative portion (i.e., a greater number of scratches observed before peeling).

The evaluation results are shown in Table 1 below.

TABLE 1

|  | Example 1 | Example 2 | Example 3 | Example 4 | Example 5 | Comparative Example 1 |
|---|---|---|---|---|---|---|
| E1' (Pa) | $9.8 \times 10^5$ | $9.8 \times 10^5$ | $4.2 \times 10^6$ | $9.8 \times 10^5$ | $9.8 \times 10^5$ | $4.2 \times 10^6$ |
| E2' (Pa) | $2.0 \times 10^7$ | $2.0 \times 10^7$ | $2.0 \times 10^7$ | $2.0 \times 10^7$ | $2.0 \times 10^7$ | 1.6E+08 |
| E3' (Pa) | $4.9 \times 10^6$ | $1.1 \times 10^6$ | $4.9 \times 10^6$ | $4.9 \times 10^6$ | $4.9 \times 10^6$ | — |
| E4' (Pa) | $4.8 \times 10^7$ | $4.8 \times 10^7$ | $4.8 \times 10^7$ | $4.8 \times 10^7$ | $4.8 \times 10^7$ | $4.8 \times 10^7$ |

TABLE 1-continued

|  | Example 1 | Example 2 | Example 3 | Example 4 | Example 5 | Comparative Example 1 |
|---|---|---|---|---|---|---|
| $E2' > E3' > E1'$ | Satisfied | Satisfied | Satisfied | Satisfied | Satisfied | — |
| $E2'/E3' < E3'/E1'$ | Satisfied | Unsatisfied | Unsatisfied | Satisfied | Satisfied | — |
| $E2'/E1' \geq 5$ | Satisfied | Satisfied | Unsatisfied | Satisfied | Satisfied | Satisfied |
| $E1' < E4'$ and $E3' < E4'$ | Satisfied | Satisfied | Satisfied | Satisfied | Satisfied | — |
| d1 (μm) | 40 | 40 | 40 | 40 | 40 | 40 |
| d2 (μm) | 15 | 15 | 15 | 50 | 30 | 15 |
| d3 (μm) | 10 | 10 | 10 | 10 | 10 | — |
| $d1 > d2, d3$ | Satisfied | Satisfied | Satisfied | Unsatisfied | Satisfied | — |
| $d2/d1 \leq 1/2$ and $d3/d1 \leq 1/2$ | Satisfied | Satisfied | Satisfied | Satisfied | Unsatisfied | — |
| Contrast ratio of intermediate layer < contrast ratio of print layer, contrast ratio of protective layer | Satisfied | Satisfied | Satisfied | Satisfied | Satisfied | — |
| Durability of decorative portion | 250000 | 83335 | 83333 | 50000 | 50000 | 100 |
| Resistance to external damage of decorative portion | 1000 | 400 | 1000 | 667 | 500 | 100 |

As can be seen from Table 1, the tires according to Examples 1 to 5 are superior in durability and resistance to external damage of the decorative portion to the tire according to Comparative Example 1. Furthermore, a comparison of Example 1 and Example 2 shows that Example 1, which satisfies the relational expression $E2'/E3' < E3'/E1'$, is superior in durability and resistance to external damage of the decorative portion to Example 2. A comparison of Example 1 and Example 3 also shows that Example 1, which satisfies the relational expression $E2'/E1' \geq 5$, is superior in durability of the decorative portion to Example 3. Moreover, a comparison of Example 1 and Example 4 shows that Example 1, which satisfies the relational expression $d1 > d2, d3$, is superior in durability of the decorative portion to Example 4. A comparison of Example 1 and Example 5 also shows that Example 1, which satisfies the relational expressions $d2/d1 \leq \frac{1}{2}$ and $d3/d1 \leq \frac{1}{2}$, is superior in durability of the decorative portion to Example 5.

REFERENCE SIGNS LIST

1 Pneumatic tire
2 Tread portion
3 Sidewall portion
4 Bead portion
4a Bead core
5 Carcass
6 Belt
7 Decorative portion
8 Print layer
9 Protective layer
10 Intermediate layer

The invention claimed is:

1. A pneumatic tire comprising an annular tread portion, a pair of sidewall portions extending contiguously with sides of the tread portion radially inwardly, a pair of bead portions extending contiguously with radially inner sides of the sidewall portions radially inwardly, and a decorative portion on an axially outer surface of at least one of the pair of sidewall portions, the decorative portion including a print layer and a protective layer located on a tire outer side of the print layer, wherein
the decorative portion further includes an intermediate layer located between the print layer and the protective layer, and
when a storage modulus of the print layer, a storage modulus of the protective layer, and a storage modulus of the intermediate layer are respectively defined as E1', E2', and E3', the following relational expression is satisfied:

$E2' > E3' > E1'$.

2. The pneumatic tire according to claim 1, wherein a thickness d1 of the print layer is greater than a thickness d2 of the protective layer and a thickness d3 of the intermediate layer.

3. The pneumatic tire according to claim 1, wherein the following relational expression is satisfied:

$E2'/E3' < E3'/E1'$.

4. The pneumatic tire according to claim 1, wherein the following relational expression is satisfied:

$E2'/E1' 5$.

5. The pneumatic tire according to claim 1, wherein a thickness d1 of the print layer, a thickness d2 of the protective layer, and a thickness d3 of the intermediate layer satisfy the following relational expressions:

$d2/d1 \leq \frac{1}{2}$; and $d3/d1 \leq \frac{1}{2}$.

6. The pneumatic tire according to claim 1, wherein a contrast ratio of the intermediate layer is less than a contrast ratio of the print layer and a contrast ratio of the protective layer.

7. The pneumatic tire according to claim 1, wherein, when a storage modulus of side rubber adjacent to the decorative portion is defined as E4', the following relational expressions are satisfied:

$E1' < E4'$; and $E3' < E4'$.

* * * * *